(12) United States Patent
Larose

(10) Patent No.: US 12,371,178 B1
(45) Date of Patent: Jul. 29, 2025

(54) METHOD AND SYSTEM FOR CONTROLLING AN AIRCRAFT PROPULSION SYSTEM IN AN AIRCRAFT SUSCEPTIBLE TO GROUND RESONANCE

(71) Applicant: Pratt & Whitney Canada Corp., Longueuil (CA)

(72) Inventor: Louis-Philippe Larose, St-Sabine (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/427,292

(22) Filed: Jan. 30, 2024

(51) Int. Cl.
  *B64D 27/33* (2024.01)
  *B64C 27/08* (2023.01)
  *B64C 27/16* (2006.01)

(52) U.S. Cl.
  CPC .............. *B64D 27/33* (2024.01); *B64C 27/08* (2013.01); *B64C 27/16* (2013.01)

(58) Field of Classification Search
  CPC ...... B64D 27/33; B64D 31/18; B64D 35/022; B64C 27/08; B64C 27/16
  See application file for complete search history.

(56) References Cited

U.S. PATENT DOCUMENTS

| | | |
|---|---|---|
| 9,248,908 B1 | 2/2016 | Luyks |
| 11,420,736 B1 | 8/2022 | Churchill |
| 2002/0005456 A1 | 1/2002 | Toulmay |
| 2018/0111679 A1* | 4/2018 | Heverly, II ........... B64C 27/001 |
| 2020/0189722 A1 | 6/2020 | Duffy |
| 2020/0277061 A1* | 9/2020 | Becker ................... B64D 37/04 |
| 2020/0290742 A1 | 9/2020 | Kumar |
| 2022/0297846 A1 | 9/2022 | Mark |
| 2023/0182919 A1 | 6/2023 | Gansler |
| 2023/0312115 A1* | 10/2023 | Alecu ..................... B64D 31/00 701/99 |
| 2023/0406523 A1* | 12/2023 | Chen ........................ F02C 6/206 |
| 2024/0034479 A1* | 2/2024 | Detweiler ............. B60W 10/06 |
| 2024/0087373 A1* | 3/2024 | O'Brien ............... G07C 5/0808 |
| 2024/0270398 A1* | 8/2024 | Cevik ........................ F02C 7/32 |
| 2024/0271547 A1* | 8/2024 | Syed ..................... B64D 35/025 |
| 2024/0271577 A1* | 8/2024 | Syed ....................... F01D 15/10 |

OTHER PUBLICATIONS

EP Search Report for EP Patent Application No. 25154969.7 dated May 9, 2025.

* cited by examiner

*Primary Examiner* — Rodney A Bonnette
(74) *Attorney, Agent, or Firm* — Getz Balich LLC

(57) ABSTRACT

A method of controlling an aircraft propulsion system in an aircraft susceptible to ground resonance is provided. The method includes: providing an aircraft having an aircraft propulsion system and a rotary blade propulsion unit, the aircraft propulsion system having an electric motor and a gearbox, wherein the electric motor is in drive communication with the gearbox and the gearbox is in drive communication with the rotary blade propulsion unit; determining the presence or absence of a parameter indicative of a ground resonance condition; and controlling the electric motor to deliver an amount of torque to the gearbox to drive the rotary blade propulsion unit to produce enough lift to make the aircraft airborne when the presence of the parameter indicative of the ground resonance condition is determined.

16 Claims, 4 Drawing Sheets

METHOD AND SYSTEM FOR CONTROLLING AN AIRCRAFT PROPULSION SYSTEM IN AN AIRCRAFT SUSCEPTIBLE TO GROUND RESONANCE

BACKGROUND OF THE INVENTION

1. Technical Field

The present disclosure relates to aircraft susceptible to ground resonance, and to methods and systems for mitigating or escaping a ground resonance condition in particular.

2. Background Information

Ground resonance may occur when the natural frequency of an aircraft structure and the landing gear of the aircraft are excited by an imbalance in the rotor system. The imbalance may be triggered by the rotor blades bunching up on one side of the rotor disc and causing an oscillation in phase with the frequency of the rocking of the helicopter on its landing gear relative to the ground surface. What is needed is a improved system and/or method that enables an aircraft to escape a ground resonance condition.

SUMMARY

According to an aspect of the present disclosure, a method of controlling an aircraft propulsion system in an aircraft susceptible to ground resonance is provided. The method includes: providing an aircraft having an aircraft propulsion system and a rotary blade propulsion unit, the aircraft propulsion system having an electric motor and a gearbox, wherein the electric motor is in drive communication with the gearbox and the gearbox is in drive communication with the rotary blade propulsion unit; determining the presence or absence of a parameter indicative of a ground resonance condition; and controlling the electric motor to deliver an amount of torque to the gearbox to drive the rotary blade propulsion unit to produce enough lift to make the aircraft airborne when the presence of the parameter indicative of the ground resonance condition is determined.

In any of the aspects or embodiments described above and herein, the aircraft propulsion system may be a hybrid-electric propulsion (HEP) system that includes a thermal engine in drive communication with the gearbox.

In any of the aspects or embodiments described above and herein, the rotary blade propulsion unit may include a plurality of rotor blades.

In any of the aspects or embodiments described above and herein, the aircraft may be a helicopter.

In any of the aspects or embodiments described above and herein, the aircraft propulsion system may be an electric power propulsion system.

In any of the aspects or embodiments described above and herein, the parameter indicative of the ground resonance may be associated with the aircraft.

In any of the aspects or embodiments described above and herein, the parameter indicative of the ground resonance may be associated with the aircraft propulsion system.

In any of the aspects or embodiments described above and herein, the step of controlling the electric motor to deliver the amount of torque to the gearbox may be a manual operation.

In any of the aspects or embodiments described above and herein, the step of controlling the electric motor to deliver the amount of torque to the gearbox may occur automatically when the presence of the parameter indicative of the ground resonance condition is determined.

According to an aspect of the present disclosure, an aircraft propulsion system for an aircraft is provided that includes an aircraft propulsion engine, a rotary blade propulsion unit, and a system controller. The aircraft propulsion engine has an electric motor and a gearbox. The electric motor is in drive communication with the gearbox and the gearbox is in drive communication with the rotary blade propulsion unit. The system controller is in communication with the electric motor and a memory that is storing instructions. The instructions when executed cause the system controller to: determine the presence or absence of a parameter indicative of a ground resonance condition; and control the electric motor to deliver an amount of torque to the gearbox to drive the rotary blade propulsion unit to produce enough lift to make the aircraft airborne when the presence of the parameter indicative of the ground resonance condition is determined.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
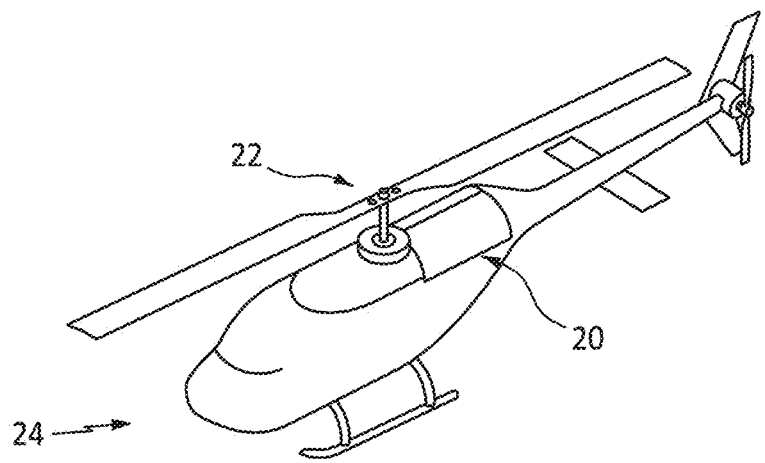
FIG. 1 is a diagrammatic view of a rotary aircraft having an aircraft propulsion system according to an embodiment of the present disclosure.

Referring to FIG. 1, the present disclosure is directed to an aircraft propulsion system 20 that utilizes an engine to drive a rotary blade propulsion unit 22. The "engine" that drives the rotary blade propulsion unit 22 may be an electric motor or it may be a hybrid-electric propulsion (HEP) system that includes a thermal engine and an electric motor. FIG. 1 diagrammatically illustrates an aircraft (e.g., a helicopter 24) that may utilize a present disclosure aircraft propulsion system 20. The present disclosure aircraft propulsion system 20 may be used with a manned or unmanned aircraft. The present disclosure is applicable to aircraft that include one or more aircraft propulsion systems 20.

Figure 2:
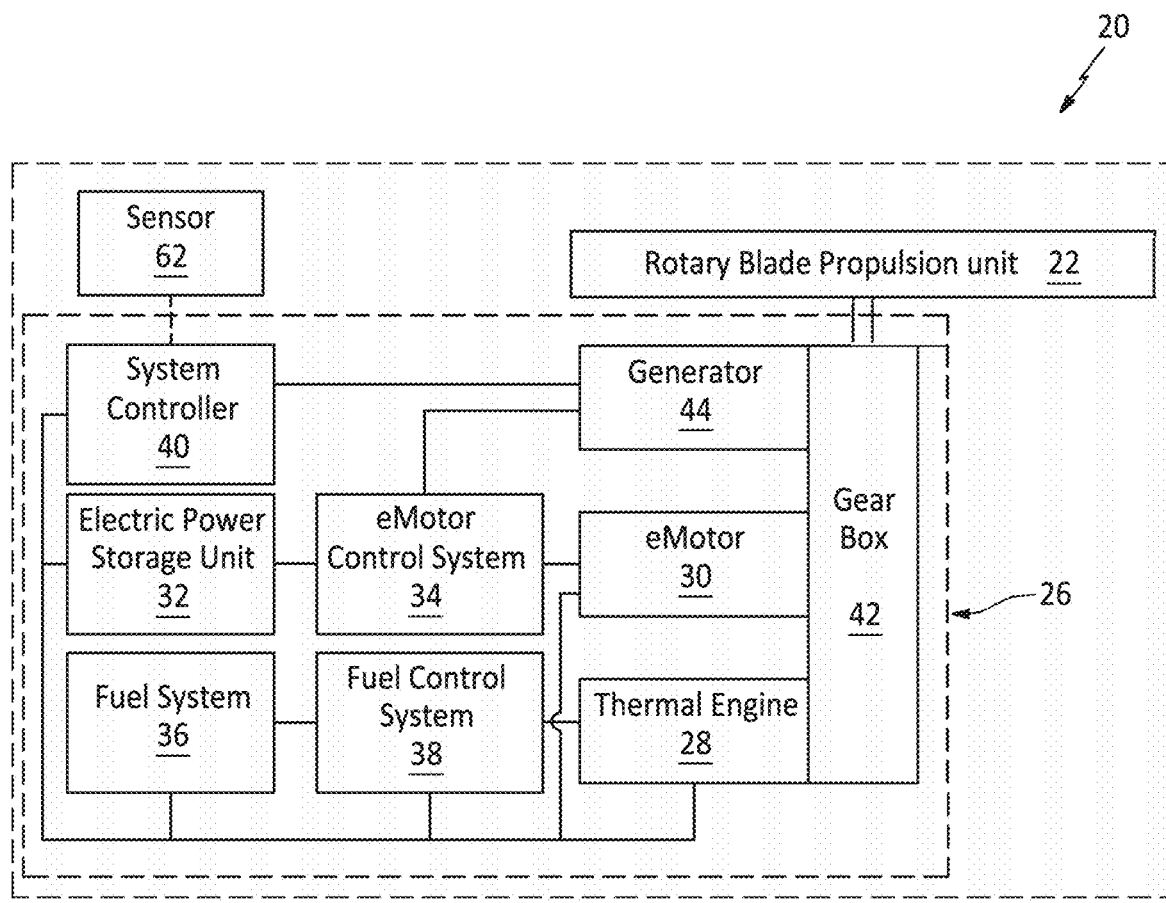
FIG. 2 is a diagrammatic representation of a hybrid-electric propulsion (HEP) system embodiment.
Figure 3:
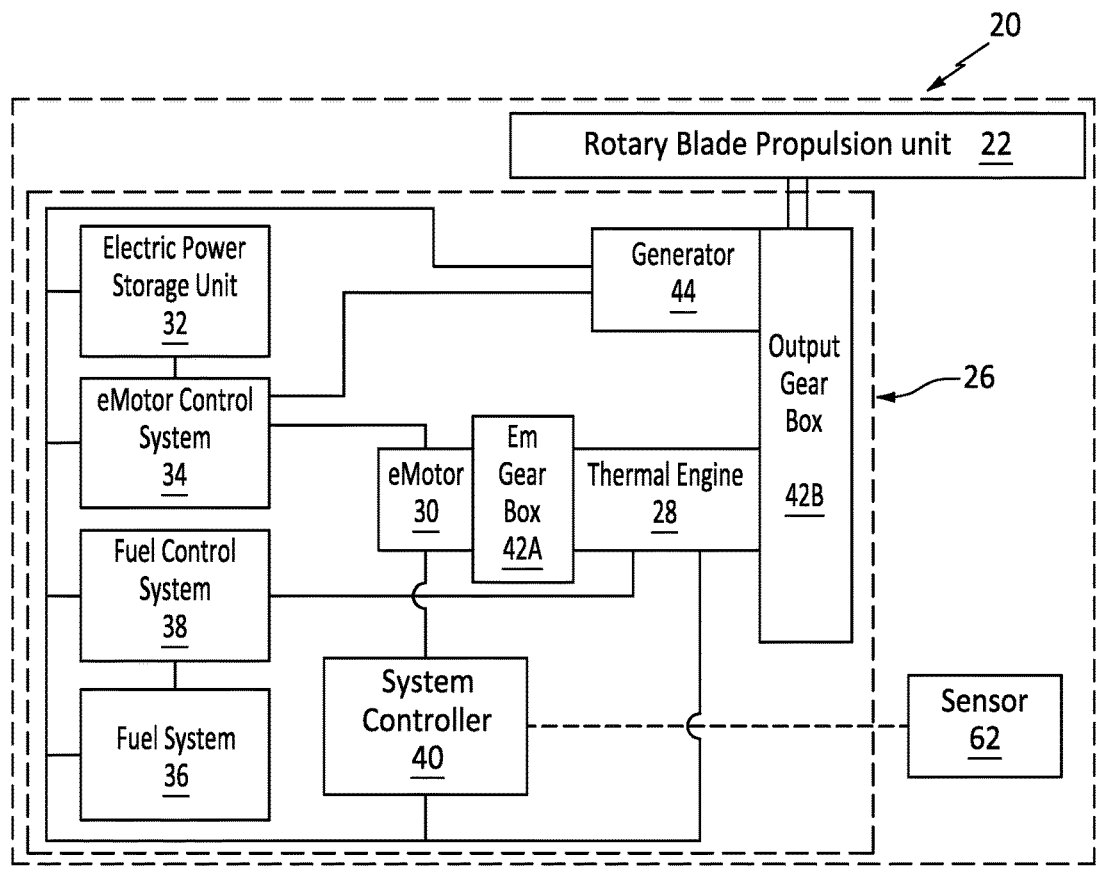
FIG. 3 is a diagrammatic representation of a HEP system embodiment.

FIGS. 2 and 3 diagrammatically illustrate aircraft propulsion systems 20 having an engine in the form of a hybrid-electric propulsion (HEP) system 26 that may be used to drive a rotary blade propulsion unit 22. In these examples, the HEP system 26 includes a thermal engine 28, an electric motor ("eMotor 30"), an electric power storage unit 32, an eMotor control system 34, a fuel system 36, a fuel control system 38, and a system controller 40. In the HEP system 26 embodiment shown in FIG. 4, a gearbox 42 is included. In the HEP system 26 embodiment shown in FIG. 3, an eM gearbox 42A and an output gearbox 42B are included. The HEP system 26 embodiments shown in FIGS. 2 and 3 are each shown with an electric generator 44 in drive communication with a gearbox. The electric generator 44 may be used to provide electrical energy to aircraft components. The present disclosure is not limited to these HEP system 26 configuration examples.

Figure 4:
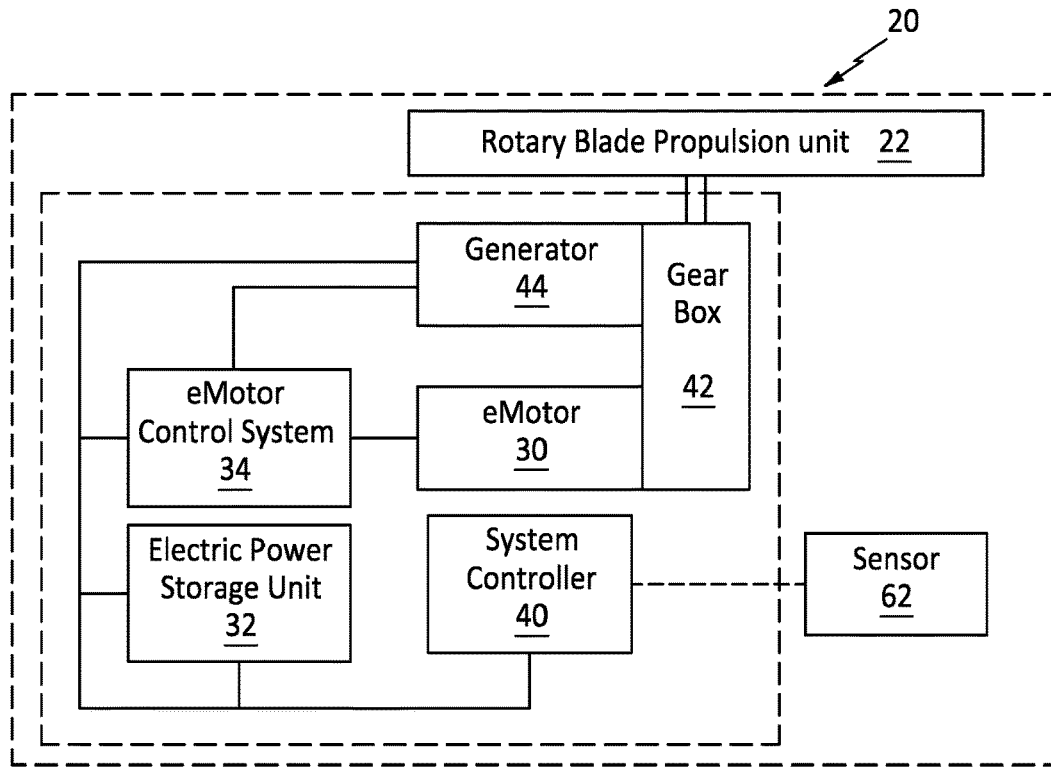
FIG. 4 is a diagrammatic representation of an electric power aircraft propulsion system.

FIG. 4 diagrammatically illustrates an example of an electric power aircraft propulsion system 20 that may be used to drive a rotary blade propulsion unit 22. In this example, the propulsion system includes an eMotor 30, an electric power storage unit 32, an eMotor control system 34, a gearbox 42, and a system controller 40. The present disclosure is not limited to this electric power propulsion system example.

Figure 5:
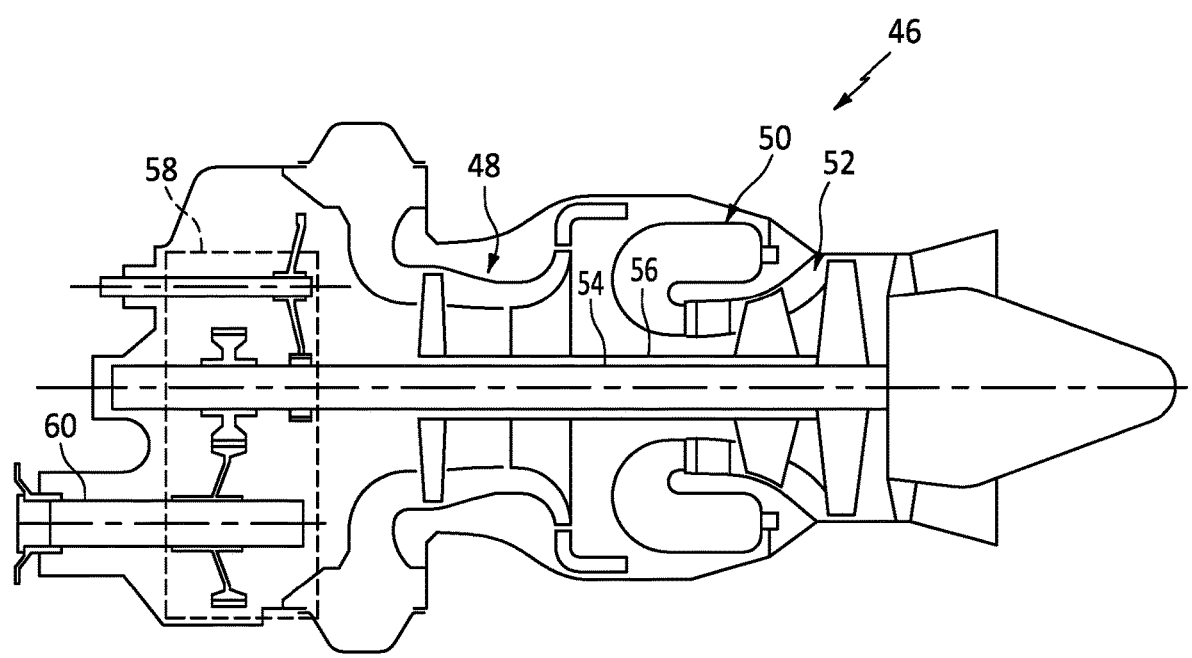
FIG. 5 is a diagrammatic sectional view of an exemplary gas turbine engine.
Figure 6:
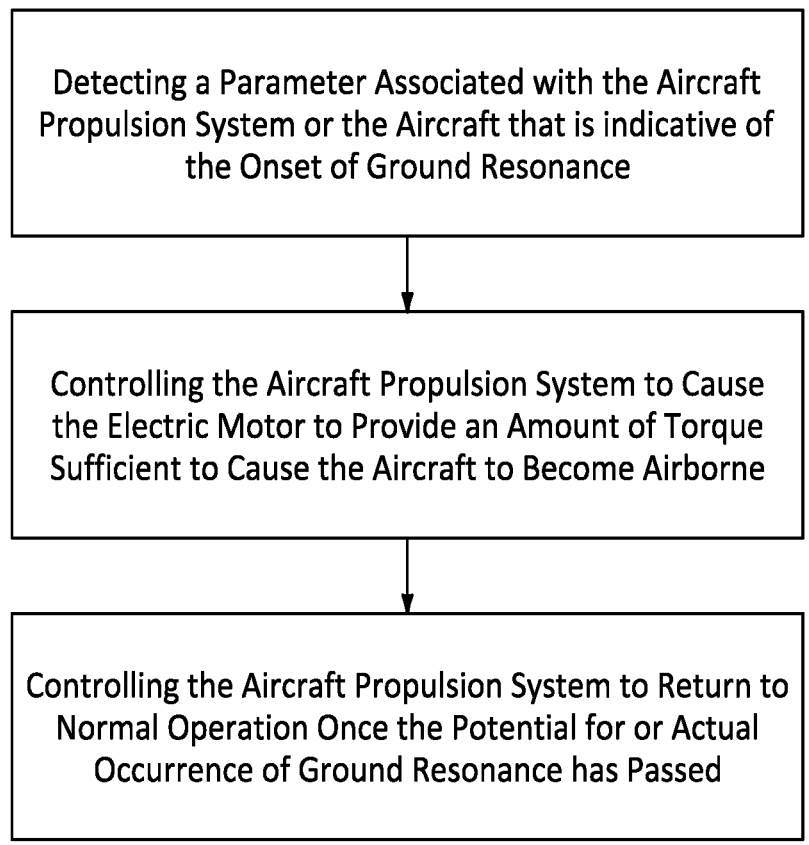
FIG. 6 is a block diagram of an embodiment of the present disclosure.

FIG. 5 illustrates an example of a thermal engine 28 that may be used in a HEP system 26 in the form of a gas turbine turboshaft engine. The turboshaft engine 46 includes a compressor section 48, a combustor section 50, a turbine section 52, a low pressure shaft 54, a high pressure shaft 56, a gearbox 58, and an external shaft 60. The high pressure shaft 56 extends between a rotor stage of the compressor section 48 and a rotor stage of the turbine section 52. The low pressure shaft 54 extends between the gearbox 58 and a rotor stage of the turbine section 52. The external shaft 60 is in drive communication with the gearbox 58 and is in communication with the rotary blade propulsion unit 22 (not shown in FIG. 5). The present disclosure is not limited to this gas turbine engine 46 configuration example, and in some embodiments the thermal engine 28 may alternatively be a may be a piston engine or a rotary engine.

The eMotor 30 utilized in an electric power propulsion system or a HEP system 26 may be an alternating current (AC) motor configured to rotationally drive a component. For example, the eMotor 30 may be configured to rotationally drive at least a portion of a gearbox 42, or may be configured to provide rotational drive to a thermal engine 28 (e.g., see FIG. 3), or the like. The eMotor 30 produces a mechanical power output that is a function of the torque produced by the eMotor 30 and the angular speed of the eMotor 30.

The rotary blade propulsion unit 22 is a driven device that is configured to selectively produce thrust that can be used to power an aircraft. In a rotary aircraft (e.g., a helicopter), the rotary blade propulsion unit 22 may include a rotor that has rotor blades.

The electric power storage unit 32 is configured to selectively store electrical energy in a first operational mode (i.e., a charging mode), and to produce electrical energy in a second operational mode (i.e., a discharging mode). An example of an electric power storage unit 32 is one that includes one or more batteries. Electric power storage devices other than batteries may be used in some embodiments.

The eMotor control system 34 may include hardware and controls for providing electrical power to the eMotor 30. In those embodiments wherein the electric power storage unit 32 provides the electrical power used to power the eMotor 30, the eMotor control system 34 may include an inverter configured to manage electrical power from the electric power storage unit 32. The eMotor control system 34 may also be configured to control the eMotor 30 to produce the desired amount of torque for driving the rotary blade propulsion unit 22 solely or in combination with the thermal engine 28. In those embodiments wherein the aircraft propulsion system 20 is an electric power propulsion system, the eMotor 30 is controlled as the sole source of drive power for driving the rotary blade propulsion unit 22. As will be explained herein, in those present disclosure embodiments wherein the aircraft propulsion system 20 is a HEP system 26, the eMotor 30 may be controlled to be the sole source of drive power for driving the rotary blade propulsion unit 22 (e.g., for segments of a flight mission) or the eMotor 30 may be controlled to provide drive power for driving the rotary blade propulsion unit 22 in combination with the thermal engine 28.

In the HEP system 26 embodiments, the fuel system 36 may include a fuel reservoir and one or more fuel pumps for pumping the fuel to the thermal engine 28.

In the HEP system 26 embodiments, the fuel control system 38 may include an electronic controller such as a FADEC or may include a mechanical controller, or any combination thereof. The present disclosure is not limited to any particular type of fuel control system.

A gearbox utilized within an aircraft propulsion system 20 may assume different configurations. The term "gearbox" as used herein may refer to a reduction gearbox that is configured to accept an input rotational drive at a first rotational drive speed (S1) and at a first torque (T1) and produce an output rotational drive at a second rotational drive speed (S2) and at a second torque (T2), wherein the first rotational drive speed is greater than the second rotational drive speed (S1>S2) and the second torque is greater than the first torque (T2>T1). The present disclosure is not limited to any particular type of gearbox.

The term "controller" (including the system controller 40 shown in FIGS. 2 and 3) as used herein refers to a device that may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the respective component to accomplish the same algorithmically and/or coordination of system components. A controller may include or may be in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. A controller may include, or may be in communication with, an input device that enables a user to enter data and/or instructions, and may include, or be in communication with, an output device configured, for example to display information (e.g., a visual display or a printer), or to transfer data, etc. Communications between a controller and other system components may be via a hardwire connection or via a wireless connection.

In HEP system 26 embodiment shown in FIG. 2, the gearbox 42 may be driven by the thermal engine 28, or by the eMotor 30, or a combination thereof, and the gearbox 42 is in drive communication with the rotary blade propulsion unit 22; e.g., a parallel configuration. The HEP system 26 embodiment shown in FIG. 3 may be described as a series configuration, wherein the rotary blade propulsion unit 22 is in drive communication with the output gearbox 42B. The output gearbox 42B may be driven by the thermal engine 28. The thermal engine 28 may be driven partially or completely by the eMotor 30 through the eM gearbox 42A. An example of the eMotor 30 "partially driving" the thermal engine 28 is when the eMotor 30 is providing rotational motive force to the thermal engine 28 when the thermal engine 28 itself is operating. An example of the eMotor 30 "completely driving" the thermal engine 28 is when the eMotor 30 is providing rotational motive force to the thermal engine 28 when the thermal engine 28 is not operating.

A HEP system 26, as may be utilized with the present disclosure, may use any combination of the eMotor 30 and the thermal engine 28 to provide motive force to a rotary blade propulsion unit 22, and the relative contributions of motive force provided by the eMotor 30 and the thermal engine 28 may change during different portions of the flight mission and under different scenarios as will be detailed herein.

Referring to FIGS. 2-6, embodiments of the present disclosure include a method and system for controlling an aircraft propulsion system 20 in an aircraft susceptible to ground resonance. The term "susceptible" is used herein to describe that the aircraft may experience ground resonance under certain environmental/operational conditions, and will not experience ground resonance under other conditions. Ground resonance can be triggered by a number events. For example, a hard landing or a landing with asymmetrical contact may be a factor in the onset of ground resonance. The type of landing gear utilized by the aircraft may be another factor. If the aircraft utilizes pneumatic tires, the state of inflation of those tires may be a factor. Whether or not the aircraft includes vibration damping devices (e.g., rotor damping devices, or landing gear damping devices, or the like) may be a factor, and if the aircraft does include such damping devices, the operational state of those damping devices may be a factor. These events and/or factors may play a part in whether the aircraft rocks on its landing gear. The rocking may cause the main rotor hub of the aircraft to effectively move back/forth. As the rotor hub accelerates one direction, inertial forces may push the rotor blades to "bunch up". If the frequency of the aircraft fuselage rocking on the landing gear coincides with the natural frequency of the blade motion, the two oscillations can feed each other and produce a ground resonance condition. In some instances, a ground resonance condition may be mitigated by aircraft components (e.g., rotor blade dampers, landing gear dampers, pneumatic landing gear tires, or the like) that function to dampen the oscillation in phase with the frequency of the rocking of the aircraft. The damping, if adequate, will prevent the resonant condition from escalating in amplitude to a point beyond whatever damping capability is present. Of course, if the aircraft does not include these damping components, or if the magnitude of the resonant oscillation exceeds their damping capability, then the ground resonance condition may still be problematic. An aircraft that is able to become airborne during the onset of a ground resonance condition may escape the ground resonance since the ground surface is an integral element in the resonant response. The window of time within which the aircraft can become airborne and thereby avoid the ground resonance condition is, however, typically very short. A thermal engine 28 that is used to provide drive power to a rotary blade propulsion unit 22 will typically have a response time lag between a command to increase power, and the point in time when the increase in power actually occurs. Hence, depending on when the power command is made and/or the duration of response time lag that is inherent in the thermal engine 28, it may not be possible to escape a ground resonance condition by commanding the thermal engine 28 of an aircraft propulsion system 20 to accelerate.

The present disclosure leverages the fact that the response time of an eMotor 30 to produce drive power is substantially faster than that of a thermal engine 28. This is particularly true when the thermal engine 28 is a gas turbine engine. The eMotor 30 may be a component of an electric power propulsion system or it may be part of a HEP system 26.

The present disclosure aircraft propulsion system 20 may be configured with sensors 62 and/or control logic that is able to detect a parameter associated with the aircraft propulsion system 20 or the aircraft indicative of the onset of ground resonance. A non-limiting example of such a parameter may be deviations or fluctuations in the torque provided to the rotary blade propulsion unit 22, or vibrations within the rotary blade propulsion unit 22, or fluctuations in measured stress values within the rotary blade propulsion unit 22, or fluctuations in measured accelerometer values within the rotary blade propulsion unit 22, or the like, or any combination thereof. The present disclosure is not limited to any particular type of sensor input or control logic for detecting a parameter indicative of the onset of ground resonance.

In some embodiments, the present disclosure aircraft propulsion system 20 may be configured (e.g., via stored instructions) to allow an operator to manually to control the aircraft propulsion system 20 to cause the eMotor 30 to produce an amount of torque to the rotary blade propulsion unit 22 sufficient to cause the aircraft to become airborne. In some embodiments, the present disclosure aircraft propulsion system 20 may be configured (e.g., via stored instructions) to automatically control the aircraft propulsion system 20 to cause the eMotor 30 to produce an amount of torque to the rotary blade propulsion unit 22 sufficient to cause the aircraft to become airborne. In those embodiments wherein the aircraft propulsion system 20 is configured to automatically control the aircraft propulsion system 20, the system may include control logic/structure that allows the operator to override the automatic control in favor of a manual control. In some embodiments, the present disclosure aircraft propulsion system 20 may be configured with a hybrid manual/automatic control logic; e.g., the system may respond to an abrupt increase in power demand at the throttle, in combination with other input (e.g., sensor input or control logic control), and cause the eMotor 30 to produce an amount of torque to the rotary blade propulsion unit 22 sufficient to cause the aircraft to become airborne. The sensors 62 and/or control logic able to detect a parameter indicative of the onset of ground resonance may also be used to provide information indicative of the absence of the aforesaid parameters; i.e., no indication of ground resonance or parameters indicative of the onset of ground resonance. In the absence of a ground resonance indication of a parameter indicative of the onset of ground resonance, the present disclosure may be configured to override the control logic that permits a response thereto; i.e., the control logic will not cause the eMotor 30 to produce the torque sufficient to cause the aircraft to become airborne but and rather will default to control logic applicable to "normal" operation. Hence, in those instances wherein a ground resonance condition is identified and acted upon, once the ground resonance condition has passed, the system may be configured to return to normal operation. The present disclosure is not limited to the above control logic examples.

Embodiments of the present disclosure may be described herein as a process which is depicted as a flowchart, a flow diagram, a block diagram, etc. Although any one of these structures may describe the operations as a sequential process, many of the operations can be performed in parallel and/or concurrently. In addition, the order of the operations may be rearranged. A process may correspond to a method, a function, a procedure, a subroutine, a subprogram, etc.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of controlling an aircraft propulsion system in an aircraft susceptible to ground resonance, the method comprising:
providing an aircraft having an aircraft propulsion system and a rotary blade propulsion unit, the aircraft propulsion system having an electric motor and a gearbox, wherein the electric motor is in drive communication with the gearbox and the gearbox is in drive communication with the rotary blade propulsion unit;
determining the presence or absence of a parameter indicative of a ground resonance condition; and
controlling the electric motor to deliver an amount of torque to the gearbox to drive the rotary blade propulsion unit to produce enough lift to make the aircraft airborne when the presence of the parameter indicative of the ground resonance condition is determined.

2. The method of claim 1, wherein the aircraft propulsion system is a hybrid-electric propulsion (HEP) system further including a thermal engine in drive communication with the gearbox.

3. The method of claim 2, wherein the rotary blade propulsion unit includes a plurality of rotor blades.

4. The method of claim 3, wherein the aircraft is a helicopter.

5. The method of claim 1, wherein the aircraft propulsion system is an electric power propulsion system.

6. The method of claim 1, wherein the parameter indicative of the ground resonance is associated with the aircraft.

7. The method of claim 1, wherein the parameter indicative of the ground resonance is associated with the aircraft propulsion system.

8. The method of claim 1, wherein the step of controlling the electric motor to deliver the amount of torque to the gearbox is a manual operation.

9. The method of claim 1, wherein the step of controlling the electric motor to deliver the amount of torque to the gearbox occurs automatically when the presence of the parameter indicative of the ground resonance condition is determined.

10. An aircraft propulsion system for an aircraft, the system comprising:
- an aircraft propulsion engine and a rotary blade propulsion unit, the aircraft propulsion engine having an electric motor and a gearbox, wherein the electric motor is in drive communication with the gearbox and the gearbox is in drive communication with the rotary blade propulsion unit; and
- a system controller in communication with the electric motor and a memory storing instructions, which instructions when executed cause the system controller to:
- determine the presence or absence of a parameter indicative of a ground resonance condition; and
- control the electric motor to deliver an amount of torque to the gearbox to drive the rotary blade propulsion unit to produce enough lift to make the aircraft airborne when the presence of the parameter indicative of the ground resonance condition is determined.

11. The system of claim 10, wherein the aircraft propulsion engine is a hybrid-electric propulsion (HEP) system further including a thermal engine in drive communication with the gearbox.

12. The system of claim 11, wherein the rotary blade propulsion unit includes a plurality of rotor blades.

13. The system of claim 12, wherein the aircraft is a helicopter.

14. The system of claim 10, wherein the aircraft propulsion engine is an electric power propulsion system.

15. The system of claim 10, wherein the parameter indicative of the ground resonance is associated with the aircraft.

16. The system of claim 10, wherein the parameter indicative of the ground resonance is associated with the aircraft propulsion engine.

* * * * *